(12) United States Patent
Zhang et al.

(10) Patent No.: US 10,684,694 B2
(45) Date of Patent: Jun. 16, 2020

(54) EXTENDING INTERACTIONS OF A PORTABLE ELECTRONIC DEVICE

(71) Applicant: Georgia Tech Research Corporation, Atlanta, GA (US)

(72) Inventors: Cheng Zhang, Atlanta, GA (US); Gregory D. Abowd, Atlanta, GA (US); Junrui Yang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 16/328,684

(22) PCT Filed: Aug. 29, 2017

(86) PCT No.: PCT/US2017/049103
§ 371 (c)(1),
(2) Date: Feb. 26, 2019

(87) PCT Pub. No.: WO2018/044880
PCT Pub. Date: Mar. 8, 2018

(65) Prior Publication Data
US 2019/0204932 A1    Jul. 4, 2019

Related U.S. Application Data

(60) Provisional application No. 62/380,691, filed on Aug. 29, 2016.

(51) Int. Cl.
*G06F 3/01*    (2006.01)
*G06F 1/16*    (2006.01)
(Continued)

(52) U.S. Cl.
CPC .............. *G06F 3/017* (2013.01); *G06F 1/163* (2013.01); *G06F 1/1694* (2013.01);
(Continued)

(58) Field of Classification Search
None
See application file for complete search history.

(56) References Cited

U.S. PATENT DOCUMENTS

| 8,624,836 B1 | 1/2014 | Miller et al. |
| 2009/0059730 A1 | 3/2009 | Lyons et al. |

(Continued)

FOREIGN PATENT DOCUMENTS

WO    2016/111668    7/2016

OTHER PUBLICATIONS

Zhang, et al., "BeyondTouch: Extending the Input Language with Built-In Sensors on Commodity Smartphones," IUI, Mar. 29-Apr. 1, 2015.

(Continued)

*Primary Examiner* — Nicholas J Lee
(74) *Attorney, Agent, or Firm* — Troutman Sanders LLP; Ryan A. Schneider (57) ABSTRACT

A portable electronic device having improved user input capabilities and methods for controlling the same are provided. The device includes sensors capable of detecting and classifying user inputs provided as gestures performed on a surface of the device, wherein the surface does not include the sensors for detection of the gesture, nor is the surface in direct communication with the sensors for detection of the gesture. The device includes a microprocessor that performs instructions in response to the provided user input gestures.

24 Claims, 3 Drawing Sheets

(51) Int. Cl.
    *G06F 3/041*           (2006.01)
    *G06F 3/0346*        (2013.01)
    *G06F 3/038*          (2013.01)

(52) U.S. Cl.
    CPC .......... *G06F 3/0346* (2013.01); *G06F 3/0383* (2013.01); *G06F 3/041* (2013.01); *G06F 3/0416* (2013.01); *G06F 3/0414* (2013.01); *G06F 2200/1636* (2013.01)

(56) References Cited

U.S. PATENT DOCUMENTS

2014/0139454 A1    5/2014   Mistry et al.
2015/0077400 A1    3/2015   Eriksson et al.
2015/0160731 A1    6/2015   Yun
2016/0299570 A1   10/2016   Davydov

OTHER PUBLICATIONS

International Search Report and Written Opinion from PCT/US2017/049103 dated Nov. 16, 2017 (9 pages).

McGrath, et al., "Detecting Tapping Motion on the Side of Mobile Devices by Probabilistically Combining Hand Postures," UIST'14 Oct. 5-8, 2014.

Wen, et al., "Serendipity: Finger Gesture Recogniation Using an Off-the-Shelf Smartwatch," CHI'16, May 7-12, 2016.

Zhang, et al., "BackTap: Robust four-Point Tapping on the Back of an Off-the-Shelf Smartphone," UIST'13 Adjunct, Oct. 8-11, 2013.

Search Report from related European Application No. 17847362.5 dated Mar. 30, 2020 (9 pages).

EXTENDING INTERACTIONS OF A PORTABLE ELECTRONIC DEVICE

CROSS-REFERENCE TO RELATED APPLICATIONS

This application claims priority to U.S. Provisional Patent Application No. 62/380,691 filed Aug. 29, 2016, the disclosure of which is incorporated herein by reference in its entirety.

BACKGROUND

1. Field

The present disclosure relates generally to electronics, and more particularly to providing user commands to portable electronic devices by non-traditional means.

2. Description of Related Art

Many portable electronic devices, by necessity, are relatively small compared to traditional computing devices. Smaller electronic devices have limited means for user input compared to larger electronic devices. Comparing, for example, a personal computer to a smart phone, and a smart phone to a smart watch, means by which users can provide input commands become increasingly limited and interactions can become more challenging and frustrating to a user. A smart phone is not practically used with a keyboard and a mouse in the same way that a keyboard and a mouse can be used by a personal computer. Most modern smart phones overcome this challenge by utilizing a touch screen for both user inputs and user outputs. However, the use of a touch screen presents certain limitations.

Many electronic devices smaller than a smart phone may also utilize a touch screen; however particular problems arise due to the smaller screen size of the smaller device that inhibit the richness of user interactions with the smaller device. Many successful touch screen interactions on smart phones, including some multi-touch gestures, cannot be readily reproduced on smaller devices. Interaction issues, such as a finger occluding portions of the screen, may seem insignificant on a smart phone, but are exaggerated on smaller devices.

Portable electronic devices may also be wearable, which presents additional challenges for providing user input. While a smart phone can be moved from one hand to another, repositioned within a user's hand, set down on a surface, or picked up from a surface, wearable electronic devices are physically tethered to a user, limiting the range of physical interactions that a user can have with the wearable device. For example, a family of gesture inputs that may work on a handheld portable device such as a smart phone is not likely to be directly translatable to, for example, a smart watch. Additionally, although certain smart phones and their screens have scaled up in size in recent years, providing some users with enriched user experiences, scaling up the size of wearable electronic devices may not be desirable to consumers. For example, the size of a watch face would necessarily have to be small enough to fit the wrist of the user. Watch faces typically fall within the size range of 24 mm to 64 mm in diameter with thicknesses of a few millimeters. The smaller size of smart watches and other small portable devices present additional difficulties for providing user interactions.

Additional issues arise with providing interactions with soft or flexible components of an electronic device. The lack of rigidity makes interactions therewith unintuitive.

Related work has explored how to improve the user experience of smart watches and other small electronic devices to overcome the inherent limits of the small touch screen and form factor and the limitations of user interaction with wearable devices. Some approaches include increasing the size of the screen area, reducing the size of the touch area, or by applying carefully designed touch screen gestures. Other approaches include modifying the device to include additional sensors specifically designed to capture additional gestures, or requiring the user to wear additional sensors to communicate with the device. Such approaches include adding touch-sensitive technology to a wrist band, having the user wear a ring to track finger movement, having the user wear an additional arm band, mounting cameras to the user's body, adding proximity sensors to the device, or adding photo-reflective distance sensors to the device, for example.

Much of the related work is still in the research phase and has not reached a commercial market. The requirements for additional hardware to be worn by the user or significant re-design of existing devices may prove impractical or unattractive to a consumer. Additional hardware may also require additional power consumption. Smaller portable devices have limited space for batteries or other power storage components, making power consumption a significant design consideration. Wearable devices may also have form factor constraints that may restrict the size, shape, and, consequently, energy storage capabilities of integrated batteries or other power storage components. Therefore, the related art may also prove to be impractical for power consumption design considerations.

Accordingly, it is desirable to provide input into a portable electronic device using sensors built-in to many commercially available devices. The advantage of such technology is that it does not require additional hardware beyond what is already included in many devices, and therefore the technology can be readily implemented through software or firmware on such devices. It is also desirable that input methods address the technological challenges discussed above, for example, those presented by wearable electronic devices due to the shape, the worn position, and the size of wearable electronic devices.

There therefore exists a need to design gestures compatible with wearable electronic devices and how the devices are worn by a user that can expand the input capabilities of wearable electronic devices using sensors and hardware built-in to existing wearable electronic devices.

SUMMARY

Briefly described, in an example form, certain embodiments include a wearable electronic device including a plurality of sensors, a surface, a microprocessor and a memory. The plurality of sensors can be configured to generate, in response to a first movement of the wearable electronic device, one or more first input signals. The memory may have instructions stored thereon that, when executed by the microprocessor, control the microprocessor to execute, in response to an analysis of the one or more first input signals indicating that the one or more first input signals correspond to a first gesture performed on the surface, a first command corresponding to the first gesture, the first gesture not being detectable by sensors embedded in, or in direct communication with, the surface. The wearable electronic device can be a wrist-mounted device including a face, a case, and a band, the face having no linear dimension larger than 64 mm. The first gesture can be a tap or a swipe on the surface. The surface can be on the case or on the band of the wrist-mounted device. The gesture can consist of a finger contacting the surface.

The plurality of sensors can further be configured to generate, in response to a second movement of the wearable electronic device, one or more second input signals. The microprocessor can execute instructions to further control the microprocessor to execute, in response to an analysis of the one or more second input signals indicating that the one or more second input signals correspond to a second gesture performed on the surface, a second command corresponding to the second gesture. The first command and the second command can be distinct commands mapped to the first gesture and the second gesture, respectively. The first command executed by the microprocessor can control the wearable electronic device to respond to the first gesture by providing a feedback to the user.

The plurality of sensors can include an accelerometer and a gyroscope. The one or more first input signals can consist of an acceleration signal from the accelerometer and a rotational movement signal from the gyroscope. The first gesture can be one of a plurality of gestures in a gesture family, wherein each of the plurality of gestures in the gesture family is mapped to one of a plurality of commands, and wherein the first command is one of the plurality of commands. The gesture family can consist of a left tap gesture performed by tapping a left side of the surface and a right tap gesture performed by tapping a right side of the surface. The gesture family can consist of a swipe up, swipe down, swipe left, and swipe right.

The wearable electronic can be a wrist-mounted device, and the surface is a band of the wrist-mounted device. The wearable electronic device can further include a face and a case, the case including a bezel surrounding the face, wherein the surface is the bezel.

The instructions, when executed by the microprocessor, can further control the microprocessor to analyze the one or more first input signals to determine that the first movement corresponds to the first gesture. The analysis can include gesture event detection and gesture classification. Gesture classification can be based, at least in part, on user-dependent gesture event data.

The instructions, when executed by the microprocessor, can further control the microprocessor to analyze one or more second input signals generated by the plurality of sensors to determine that the one or more second input signals do not correspond to a gesture in a gesture family detectable by the wearable electronic device.

The wearable electronic device can further include a transceiver. The instructions, when executed by the microprocessor, can further control the microprocessor to transmit, using the transceiver, the one or more first input signals to a paired device for analysis of the one or more first input signals.

Briefly described, in an example form, certain embodiments include a method including capturing, in response to a movement of a wearable electronic device, first sensor data from one or more sensors integral to the wearable electronic device and providing, in response to an analysis of the first sensor data indicating that the movement corresponds to a first gesture performed on a surface of the wearable electronic device, a first command corresponding to the first gesture to a microprocessor of the wearable electronic device, the first gesture not being detectable by sensors embedded in, or in direct communication with, the surface.

The method can further include analyzing the first sensor data. Analyzing the first sensor data can include performing gesture event detection and performing gesture classification. Gesture event detection can include comparing a peak value from the first sensor data to a threshold value. Gesture classification can include extracting a plurality of features from the first sensor data, generating an event vector based on the plurality of features, and comparing the event vector to a plurality of gesture classification models. The plurality of gesture classification models can include user-independent models. The plurality of gesture classification models can be based, at least in part, on a plurality of contacts to the surface, each of the plurality of contacts corresponding to one of a plurality of gestures in a gesture family.

Gesture event detection can include distinguishing a gesture event from a non-gesture event.

The plurality of gestures in a gesture family can correspond to up, down, left, and right navigation commands. The plurality of gestures can represent acknowledge and reject commands.

The first sensor data can include an acceleration signal and a rotational movement signal.

Analyzing the first sensor data can include extracting a plurality of features from the first sensor data. The analyzing can further include generating an event vector based on the plurality of features. The analyzing can further include comparing the event vector to a plurality of gesture classification models.

The first gesture can be a tap or a swipe on the surface. The first gesture can be one of a plurality of gestures in a gesture family, wherein each of the plurality of gestures in the gesture family is mapped to one of a plurality of commands, and wherein the first command is one of the plurality of commands.

The wearable electronic device can be a wrist-mounted device. The contact can be a swipe on a band of the wrist-mounted device.

The method can further include providing, based on the first command provided to the microprocessor, feedback to the user. The feedback to the user can include a selection of a menu item displayed on a screen of the wearable electronic device or the selection of a button displayed on the screen.

Gesture event detection can include determining an event window that includes gesture event data.

The method can further include capturing second sensor data from the one or more sensors integral to the wearable electronic device and analyzing the second sensor data to determine that the second sensor data does not correspond to a gesture in a gesture family detectable by the wearable electronic device.

Briefly described, in an example form, certain embodiments include a non-transitory computer readable medium having stored thereon computer program code that, when executed by a processor, controls a processor to perform all or a portion of the method.

DETAILED DESCRIPTION

To facilitate an understanding of the principles and features of the various embodiments of the invention, various illustrative embodiments are explained below. Although example embodiments are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the example embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the certain example embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" or "substantially" one particular value and/or to "about" or "approximately" or "substantially" another particular value. When such a range is expressed, other example embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of certain embodiments are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

1. Overview

Various example embodiments of a wearable electronic device and methods to be used with the wearable electronic device are presented. Embodiments utilize surfaces of the wearable electronic device for providing user input to the wearable electronic device. The utilized surfaces do not require sensors (e.g., touch sensors, pressure sensors) or buttons (e.g. switches) embedded into or in direct communication with the surfaces for recognizing the user input. By extending the user input surface outward, for example to the case, the bezel of a face, or the band, the user can view the screen of the wearable electronic device while interacting with the wearable electronic device.

Some example embodiments utilize inertial sensors to provide a variety of tapping and sliding gestures on the side, bezel, and band of a wrist-worn wearable electronic device such as a smart watch. In some embodiments, feature vectors derived from inertial sensor data collected when the user performs a gesture can be compared to user-dependent, user-independent, and user-adaptive models of gestures in a gesture family.

Figure 1A:
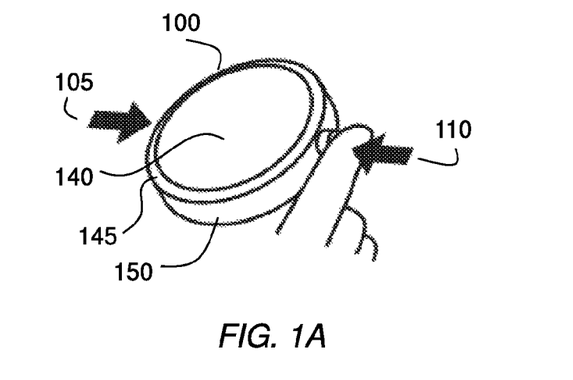
FIGS. 1A, 1B, and 1C illustrate interactions with a wearable electronic device according to example embodiments.
Figure 1B:
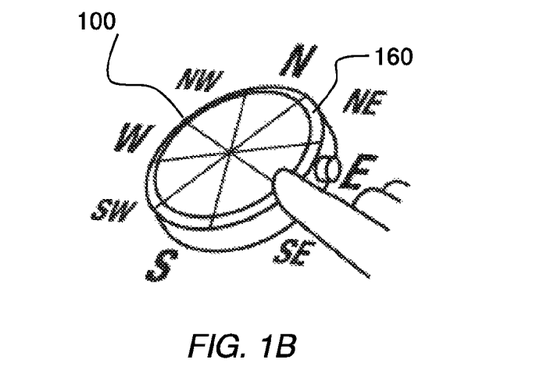
Figure 1C:
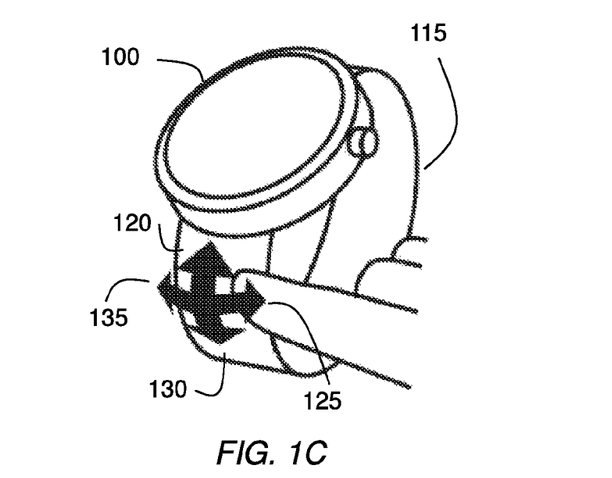

FIGS. 1A, 1B, and 1C illustrate three possible gesture families for a wrist mounted wearable electronic device 100 according to example embodiments herein referred to as SideTap, BezelInputs, and BandSwipe respectively. The wrist-mounted device 100 has a face 140, a band 115, and a case with an outer perimeter 150 and a bezel 145. The face 140 is a surface of the wearable electronic device 100 that can provide visual information to the user (e.g. time, weather, etc.) and can also be a touch-input surface for providing user input. The band 115 can function to secure the wearable electronic device 100 to an arm of the user.

Although a wrist mounted device is depicted, gesture families may be applied to other wearable electronic devices. According to some embodiments, the wearable electronic device may have a square, round, or band shape, for example. According to some embodiments, the device could include a belt buckle, a strap, or jewelry, for example. As will be appreciated and understood, embodiments are not limited to the wearable electronic device or the gestures depicted in FIGS. 1A, 1B, and 1C.

FIG. 1A illustrates the SideTap gesture family including two gestures, right tap 110 and left tap 105, wherein the user can provide an input by providing a short tap to the right or the left of the outer perimeter 150 of the wearable electronic device 100. Right tap 110 and left tap 105 can be performed eyes-free, and can be appropriate for performing simple acknowledge or dismiss actions, such as rejecting a phone call.

FIG. 1B illustrates the BezelInputs gesture family including eight bezel input gestures at eight bezel input locations 160, labeled N, NE, E, SE, S, SW, W, and NW, wherein the user can provide an input by briefly pressing the bezel 145 of the wearable electronic in one of the eight bezel input locations 160. As shown in FIG. 1B the bezel input locations 160 can be equally distributed around the bezel 145. As non-limiting examples, a configuration of BezelInputs can be used for navigating directionally, or for launching applications, for example. As will be appreciated and understood, the number and location of bezel input locations 160 may vary depending on the specific functionality being performed and the ability of the wearable electronic device 100 to gather sufficient sensor data to distinguish between distinct bezel input locations 160. In some embodiments, bezel inputs 160 can help facilitate richer menus on or interactions with the wearable electronic device. For example, most wrist-mounted wearable electronic device applications can only display a limited number of menu choices (usually around three items) due to the limited screen real estate provided for display and touch-input. However, by utilizing the BezelInputs gesture family, additional inputs are available.

FIG. 1C illustrates the BandSwipe gesture family including four gestures on the band 115 of the wearable electronic device 100. As illustrated, the band swipe gesture family can include swipe up 120, swipe down 130, swipe left 135, and swipe right 125. In some embodiments, the four gestures can be used in applications that require directional controls, for example. The BandSwipe gesture family may offer additional modality for navigation, for example, navigating through lists or menus. For example, the swipe up 120 and swipe down 130 may scroll through a vertical list of items. In some embodiments, band swipe gestures can be used in combination with the touch screen to enhance interaction. Although the BandSwipe gesture family has been described including four gestures performed on a band 115 of the wearable electronic device 100, these are merely examples. Additional or alternative gestures may be detectable on the band or other soft or flexible components of the wearable electronic device 100 according to the present disclosure.

The gesture families illustrated in FIGS. 1A, 1B, and 1C are only examples and are not intended to be limiting. Additional gestures and gesture families, (such as a swipe along the bezel) including gestures appropriate for alternative forms of wearable electronic devices (e.g. a device worn on a different part of the body such as the chest, upper arm, thigh, or ankle) may be realized according to some embodiments. Gesture families could include any combination of the gestures illustrated in FIGS. 1A, 1B, and 1C and are not limited to the combinations shown. Gesture families could include a complete set of gestures that are not shown in FIGS. 1A, 1B, and 1C or some combination of shown gestures and gestures not shown.

2. Demonstrations—Sensor Data Collection

To illustrate possible implementations of the wearable electronic device technology, aspects of some embodiments were implemented using two Android Wear smart watches: the LG G Watch Urbane and the Sony SmartWatch3. The LG Watch had a round screen and a leather wrist band. The Sony watch had a square screen and a rubber wristband.

Figure 2A:
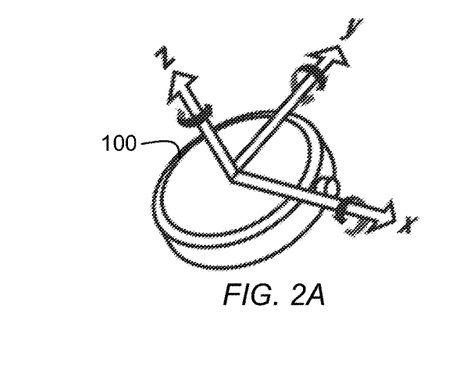
FIGS. 2A, 2B, 2C, and 2D each depict the magnitude of a rotational movement signal generated by gyroscopic sensors according to example embodiments.
Figure 2B:
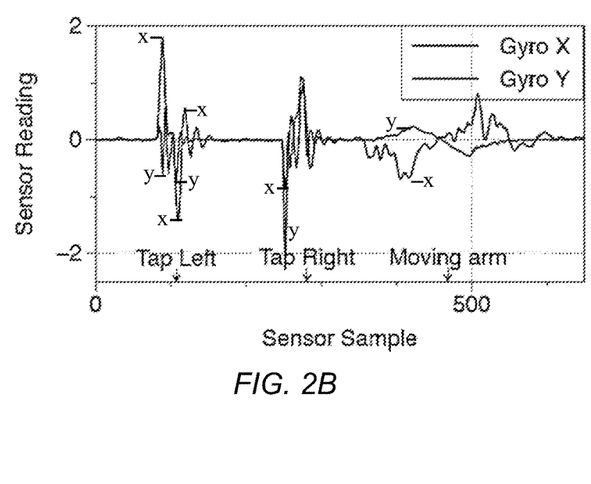
Figure 2C:
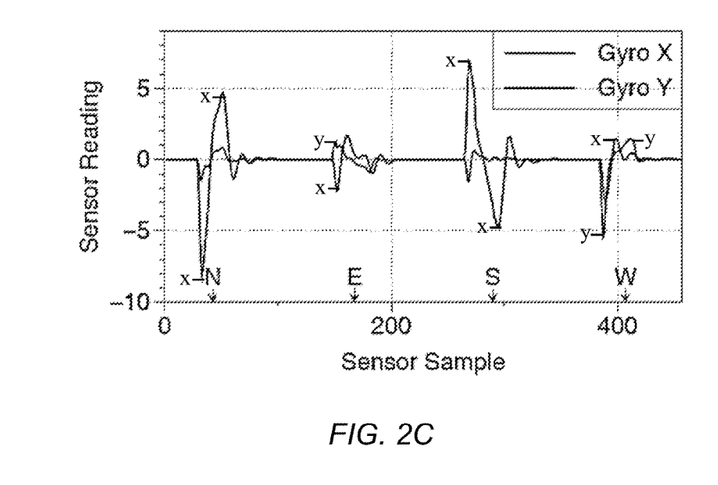
Figure 2D:
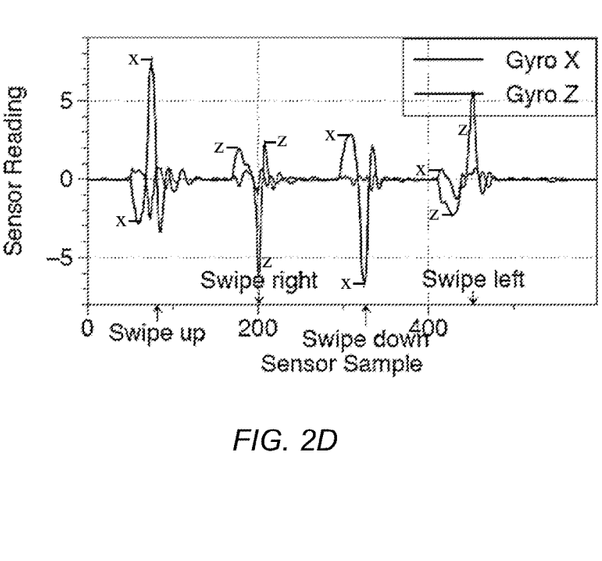

Many wearable electronic devices include an inertial measurement unit that may include a gyroscope and an accelerometer. According to some embodiments, the wearable electronic device 100 may generate inertial measurement sensor signals relative to three axes of motion (x, y, and z) as illustrated in FIG. 2A. One of ordinary skill would recognize that these are merely examples, and axes of motion may be set based on, for example, a design of the wearable electronic device and the location and orientation of various sensors. FIGS. 2B, 2C, and 2D depict raw sensor signal data collected from a gyroscope in a smart watch in response to different gestures. The figures illustrate that gestures may result in gyroscope sensor data that has distinguishable features for each gesture. Similarly, accelerometer sensor data generated in response to gesture inputs may result in distinguishable features within the accelerometer sensor data for each gesture (data not shown).

FIG. 2B depicts motion in the x- and y-axes of rotation for the left tap 105 and right tap 110 gestures and non-gesture related motion of the arm of the user where the watch is worn according to an implementation of an example embodiment. As shown in FIG. 2B, the left tap gesture 105 generated in a positive spike along the x-axis of the gyroscope data while the right tap gesture 110 generated a negative spike. The lower frequency and lower intensity gyroscope data for an arm movement is also visually distinct from the comparatively harsher, higher frequency gyroscope data from a tap gesture.

Similarly, bezel input gestures at different bezel input locations 160 can be distinguished in the gyroscope sensor data. FIG. 2C shows four taps performed at the N, E, S, and W bezel input locations 160. Taps at N and S bezel input locations 160 generally generated larger x-axis (compared to y-axis) gyroscope sensor readings, and taps at E and W bezel input locations 160 generally generated larger y-axis (compared to x-axis) gyroscope readings. The y-axis gyroscope readings were observed to have a lower magnitude peak reading in comparison to peak readings on the x-axis. The orientation of the watch band in relationship to the watch face and the way the watch is worn may be contributing factors to this observation.

FIG. 2D depicts gyroscope sensor data in response to four swipe gestures 120, 125, 130, 135 performed on the band 115. Swipe up 120 and swipe down 130 tilted the wearable electronic device 100 positively and negatively along the z-axis. The four swipe gestures 120, 125, 130, 135 generated gyroscope sensor signals that were distinguishable based on visual inspection of FIG. 2D when comparing the peak sensor reading for each axis and the polarity of the peak.

3. Demonstrations—Data Capture and Analysis

Figure 3:
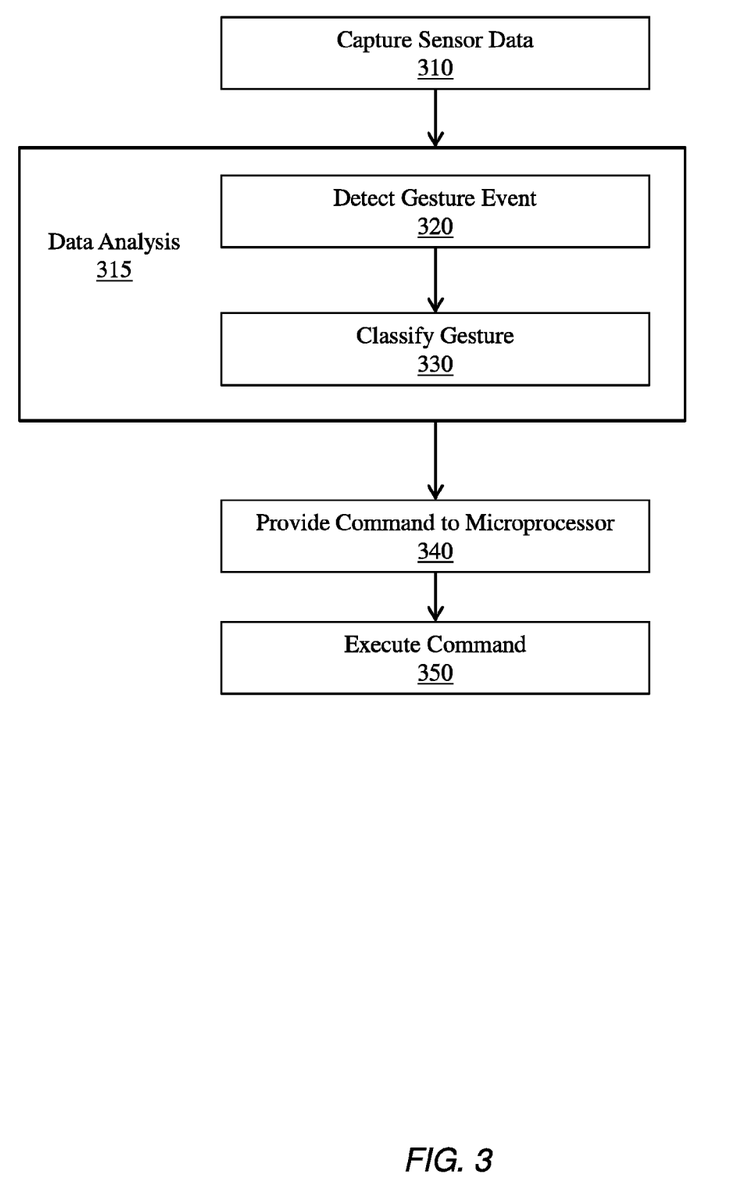
FIG. 3 illustrates a method for controlling a portable or wearable electronic device according to an example embodiment.

FIG. 3 illustrates methods to be used with the wearable electronic device according to some example embodiments. The method can include the steps of capturing sensor data 310, analyzing the sensor data 315, providing a command to a microprocessor 340, and executing the command 350.

According to some embodiments, sensor data can be captured 310 and recorded for later analysis or captured and analyzed in real time. Sensor data can include data from sensors of, for example, a device as described above. By way of example and not limitation, a sliding window can be applied to the sensor data, and data contained within the sliding window can proceed to the data analysis 315. The data analysis 315 may be performed, as non-limiting examples, by the device or some other computing device in communication with the device. For example, the device may be in wireless communication with a smart phone, and may transmit the captured sensor data 310 (raw or processed) to the smart phone for data analysis.

According to some embodiments, the data analysis 315 can include a machine learning pipeline including: (1) gesture event detection 320 and (2) gesture classification 330. Gesture event detection 320 identifies the presence of sensor data that can be an indicator that a user has input a gesture. During gesture event detection 320, the sensor data can be compared to a threshold value or values. A threshold value (or values) could be compared to data from one sensor or a combination of sensors. An event window containing data related to a user potentially inputting a gesture can be located, for example at a temporal location where the sensor data exceeds a threshold value such that the event window includes a time period that corresponds to a user inputting a gesture.

The gesture classification 330 classifies the detected gesture event as a gesture, such as, by way of example and not limitation, one of the gestures described above with reference to FIGS. 1A-1C. Gesture classification 330 can include extracting features from sensor data, generating an event vector, comparing the event vector to gesture classification models, and classifying the gesture event into a gesture family. In some cases, gesture classification may serve as a secondary check to determine whether a user has inputted a gesture. For example, the threshold value for gesture event detection 320 may be low enough to allow false positives (e.g., detecting a gesture during an event window where one did not occur); gesture classification 330 may determine whether the "detected" potential gesture is a false positive or corresponds to a gesture in a gesture family.

The classified gesture may correspond to a command to a microprocessor. The command can be provided to the microprocessor 340 in response to the gesture input on the wearable device. The command can then be executed 350. In some cases, the command may be context dependent (e.g., based on a state of the wearable electronic device or an application executing on the wearable electronic device). As a non-limiting example, the wearable electronic device may provide feedback to the user.

Aspects of some embodiments were implemented on the Sony and the LG smart watches described previously. In the example implementations (and according to some embodiments) gestures were recognized using a machine learning pipeline including two steps: (1) gesture event detection 320 and (2) gesture classification 330.

For the example implementations, during step (1) gesture event detection 320, a moving gesture detection window of one second duration with 50% overlap was applied to data from the gyroscope and accelerometer. As will be appreciated and understood, a moving gesture detection window may have a longer or shorter duration and a longer or shorter overlap in order to effectively capture gesture inputs. In the example implementations discussed above, gyroscope and acceleration sensors (linear acceleration) were sampled at the highest sampling rate allowed by the device (200-250 Hz). As will be appreciated and understood the sampling rates could vary to accurately detect and classify gesture events and to minimize the computational load needed to process the data.

In the example implementations, the rotational movement data from the gyroscope and linear acceleration data from the accelerometer were analyzed to determine if the data passed an empirically determined threshold value at any point in the gesture detection window. As would be appreciated and understood, threshold values could be determined for the accelerometer and gyroscope individually or in combination. Threshold values can be tailored to be device specific, user specific, gesture family specific, based on some other criteria, or some combination thereof.

If none of the threshold criteria were met, the implementation determined that no gesture had been performed. When a threshold criteria was met, the data analysis 315 proceeded to step (2) gesture classification 330. In some implementations, threshold values may be tailored for each gesture of the gesture family to minimize false negatives (gestures not being recognized during gesture event detection) while excluding the majority of non-gesture events (noise). In the example implementation thresholds were set to allow some non-gesture events to proceed to step (2), resulting in a reduced number of false negatives, and allowing the non-gesture events to be handled in step (2) gesture classification 330.

The temporal position of the maximum absolute value of each sensor signal was located. An event window of data values was defined for each sensor stream balanced around the maximum point, having a time period of 0.5 seconds. As will be appreciated and understood, the event window may capture a wider or narrower time period depending on the specific implementation and the type of gesture being detected (e.g. swipes may have a wider event window time period compared to taps). If the temporal position of a maximum absolute value for a sensor is too close to the edge of the gesture detection window, the event window may be extracted from the previous or next gesture detection window. As will be appreciated and understood, the event window need not be balanced around the maximum data value, and the maximum data value may be temporally offset within the event window. The event windows for each sensor identified in step (1) gesture event detection 320 proceed to step (2) gesture classification 330.

As will be appreciated and understood, according to some embodiments, a sliding window approach, including a sliding window approach that applies a signal processing window, may be applied in real time to streaming data. Gesture detection and gesture classification may be performed by a processor on a wearable electronic device. Alternatively, the wearable electronic device may be paired with or otherwise be in communication with an external computing device that may perform gesture detection and gesture classification or some computational portion thereof. In the example implementations, the smart watches were paired to a smart phone, sensor data was transmitted wirelessly to the smart phone, and the smart phone performed gesture detection and gesture classification.

According to some embodiments, during step (2) gesture classification 330, features can be calculated for each event window to generate an event vector. An event vector can be compared to models representing gesture events. Based on the event vector's fit with models representing gesture events, the event vector can be classified as representing a gesture.

In the example implementations, features were calculated for each event window for each sensor and incorporated into an event vector as follows. For each axis of the linear acceleration and rotational movement, virtual sensors were derived by taking the derivative of the data for each axis; then for each axis of the raw sensor and virtual sensors, a set of statistical features were extracted including maximum, minimum, mean, median, standard deviation, root-mean-square, variance, zero-crossing rate, and values of peaks and their differences. To capture the relationship between the different axes of each IMU sensor, the ratio and differences of the energy and first and second absolute peak values of each two axes on each sensor were calculated. In the example implementations, 192 features were extracted for each half-second instance.

4. Demonstrations—User Trials

In the example implementations (and according to some embodiments) the features were used to train two support vector machines (SVM) for gesture classification. The first classifier distinguished the non-gesture events (noise) from the gesture events. If a gesture was detected, the second classifier identified which gesture was performed, and the pipeline proceeded with the next window without overlap.

In the example implementations, training data from seven trainers was used to build two classification models (event detection and gesture classification) for each of the three gesture families and for each watch (2*3*2=12 models). Each trainer provided 20-40 samples for each gesture for training the gesture classifier and additionally provided 20-40 samples of noise (non-gestures), in order to train the event detection classifier. The noise samples included actions such as raising the arm and rotating the wrist.

The example implementations were evaluated in a laboratory environment. Twelve participants from a university campus (4 female, 8 male, average age 25) performed gestures from the three gesture families (SideTap, BezelInputs, and BandSwipe shown in FIGS. 1A, 1B, and 1C) on each of the two smart watches (LG and Sony). Four of the participants had experience using a smart watch and eight had never interacted with a smart watch. Participants wore each watch in turn on the left arm snugly below the wrist joint and used the right hand to perform the gestures.

Each gesture family was first demonstrated to each participant, and the participant practiced performing the gestures. The order of the two watches and the three gesture families for each watch were randomized. Each participant performed two sessions for each gesture family on each watch. Each session consisted of ten stimuli for each gesture in the family, presented in random order. The task was to perform the gesture indicated by each stimulus. Participants also recorded two sessions of ten "noise" events by lifting their arms. Each participant session lasted approximately one hour. For each stimulus presented to a participant, 3 seconds of sensor data was recorded for offline evaluation.

In total, 6698 gesture samples were collected. Several analyses of the gesture recognition performance were evaluated offline, using data collected from the 12 participants and the training sets including data collected from the seven trainers.

The gesture samples were first analyzed using "leave-one-participant-out" methods. Both the noise-classifiers and gesture-classifiers were trained with all the data from the seven trainers, in addition to data from the remaining eleven participants.

If during step (1) gesture event detection 320, a gesture event was not detected in a gesture event data file this gesture event counted as a false negative error. If, during step (1), more than one gesture event was identified in a gesture event data file, this gesture event counted as a false positive error. Data files of gesture events that counted as false negative or false positive did not proceed to step (2) gesture classification 330. Out of 6698 total gestures recorded, the total number of false positives was 37 and the total number of false negatives was 56. The false positive rates ranged from approximately 0% (BezelInputs on the Sony, square watch) to 2% (BandSwipe on the LG, round watch). The false negative rates ranged from approximately 0% (SideTap on the Sony, square watch) to 1% (BezelInputs on the Sony, square watch).

For the first analysis method, gesture classification 330 utilized a "leave-one-participant-out" model training method wherein the data from the trainers and all participants except for the participant data being evaluated was utilized to train gesture classification models. Training models were watch specific, i.e. data collected from trainers and participants while using the LG watch were used to train gesture classification models for the LG watch only, and likewise for the Sony watch. Gesture classification models were also gesture family specific, and data collected while a participant performed a gesture from one family was not compared against models of gestures from a different gesture family. However, this is merely exemplary and, in some implementations, a classification model may not be limited to a specific electronic device or gesture family.

The overall accuracy for correctly classifying gestures ranged from 89% for BandSwipe on the LG (round watch with leather band) to 99% for SideTap on the Sony (square watch with rubber band). Most of the gestures were recognized with accuracies of above 90%.

The SideTap gesture family was observed to have the most accurate gesture classification. The accuracies of SideTap gesture recognition were between 96% to 100% with the highest level of confusion being 4% on the LG (round) watch, wherein the left tap 105 was mistaken for a right tap 110.

Gesture classification of gestures in the BandSwipe family were considerably more accurate on the Sony (square watch with rubber band) compared to the LG (round watch with leather band). In the example analysis, the Sony watch exhibited an average accuracy of 98% with the highest level of confusion being 5%, mistaking an up swipe for a down swipe. The LG watch exhibited accuracies for each gesture ranging from 83% to 91% and an average accuracy of 89%. Based on these results, the material of the band may impact the ease with which gestures performed on the band of a wearable electronic device may be distinguished. The friction force on the band during input may be a contributing factor.

The overall accuracy for gesture recognition was similar for each watch on the SideTap and BezelInputs gesture families.

The BezelInputs family (FIG. 1B) includes eight distinguishable gestures, as compared to four for BandSwipe and two for SideTap. Observed gesture classification accuracies were 93% for each watch with the highest confusion occurring between adjacent gestures (e.g., NE or NW when N was intended). Confusion between non-adjacent gestures was observed to be less than 1% for each watch.

An analysis was performed using a subset of data collected for the BezelInputs family of gestures consisting of the subset of gestures at the N, E, S, and W bezel input locations 160. For some uses, a gesture family including four bezel input locations may be desirable, for example, for up, down, left, and right or north, south, east, and west navigation. Classification models were built using the subset of data for gestures at the N, E, S, and W bezel input locations 160 for each of the two watches.

Separately, a similar analysis was performed using a subset of data collected for the NE, SE, SW, and NW bezel input locations 160. For some uses, a family including these four bezel input locations may be desirable, particularly on square devices, such as the Sony watch, where the corners of the device make for readily available gesture targets.

The overall gesture recognition accuracy improved for models based on four bezel input locations 160 vs. eight. Gesture recognition observed on the LG (round) watch improved to more than 98% accuracy for four bezel input locations compared 93% accuracy for eight bezel input locations. On the Sony (square) watch, the gesture recognition accuracy improved to 99% for four bezel input locations compared to 93% accuracy for eight bezel input locations.

In order to determine if gesture classification accuracy improved with additional user data used in the training models, an analysis was conducted wherein data from fewer than the total number of participants was used to create gesture classification models for the SideTap, BezelInputs, and BandSwipe gesture families. In the example implementation, gesture classification accuracy improved when more participant data was included in the gesture classification models.

In order to determine if the gesture recognition models were device-independent, as well as user-independent, gesture classification models for the LG watch were used to classify gesture inputs from the Sony watch and vice versa. The cross-device accuracy results for SideTap gesture family were observed to remain at 97% on the LG watch, regardless of whether training models from the LG or Sony watch were utilized. The cross-device accuracy results for SideTap gesture family were lower at 88% on the Sony watch when models from the LG watch were utilized, compared to 99% when models from the Sony watch were utilized. Based on the observations, the shape of the wearable electronic device may contribute to the ease with which gestures can be accurately classified. For example, the Sony watch, because of its square face, may allow a user to input side tap inputs with greater consistently as compared with the LG watch having a more ambiguous left or right target on the circular face.

Continuing the device-independent analysis, the BezelInputs gesture family was evaluated for accuracy in gesture classification. The cross-device accuracy results for BezelInputs were slightly lower for the LG watch utilizing training models from the Sony watch compared to the LG watch (80% vs. 93%), and considerably lower for the Sony watch utilizing LG training models compared to the Sony training models (70% vs. 93%). Based on the observations, the shape of the wearable electronic device may contribute to the ease with which gestures can be accurately classified. For example, the Sony watch, because of the distinct corners on its square face may result in a better tap consistently in the NE, SE, SW, and NW bezel input locations 160 as compared with the LG watch having a circular face.

As will be appreciated and understood, devices, even those having the same shape, may have inertial measurement unit sensors (e.g. accelerometers and gyroscopes) located at different positions within the respective devices, oriented differently, have different response behavior, or may have different surrounding materials. These differences may also affect the ease with which device-independent gesture classification models can be developed.

In order to determine if user-dependent training data could improve the accuracy of gesture recognition, a subset of participant sessions having an overall accuracy of less than 84% were re-evaluated by adding gesture input data from other sessions performed by the respective user to the user-independent gesture classification models described above. Gesture classification accuracy was observed to increase when user-dependent data was used to train the gesture classification models. On average, gesture classification accuracy increased from 78% for the subset of participant sessions utilizing user-independent models to 86% where models additionally used 10 user-dependent gesture inputs to train gesture classification models.

According to some embodiments, user-dependent machine learning gesture classification models could also be utilized, wherein the user provides training data that could be used in place of or in addition to user-independent training data. In some cases, the gesture classification models may be dynamic, and adjust overtime based on user inputs and behavior.

5. Other Considerations

As will be appreciated and understood, the above-described implementations demonstrate certain aspects of embodiments of the present disclosure, but embodiments differ from these example implementations while staying within the scope of the present disclosure. For example, certain embodiments may be designed with additional real-world application considerations in mind.

The accuracy of gesture event detection thresholds and gesture classification models may be influenced by how a user wears a wearable electronic device. For example, some people might wear a wrist watch close to the wrist joint, while others may prefer to wear the watch further away from the wrist joint. In the user study described above, trainers and participants wore the watches further from the wrist joint to allow for flexibility of movement of the wrist. For a watch worn on the bone on the joint of the wrist, the wrist joint would be covered by the band which may limit the physical response of the inertial sensors to a tap or swipe event. As will be appreciated and understood, according to some embodiments, gesture detection thresholds and gesture classification models may be developed to so that gestures performed on watches worn close to the wrist joint can be accurately detected and classified. Similarly, according to some embodiments, thresholds and models can be tailored to accurately detect and classify gestures that are performed on watches that are worn more loosely or on the left arm. In general, and according to some embodiments, thresholds and models can be tailored for the geometry of a wearable electronic device, the position of inertial sensors with the device, the way in which the device is worn, and the motion of the user.

Although the present disclosure has generally discussed embodiments related to wearable electronic devices such as a smart watch, it will be understood that certain aspects of the disclosed technology may be implemented using or with a non-wearable or optionally wearable small electronic devices. Again, this is merely an example, and aspects of the present disclosure may be implemented in a variety of small electronic devices.

What is claimed is:

1. A wearable electronic device comprising:
    a sensor configured to generate, in response to a first movement of the wearable electronic device, a first input signal;
    a surface;
    a microprocessor; and
    a memory having stored thereon instructions that, when executed by the microprocessor, control the microprocessor to execute, in response to an analysis of the first input signal indicating that the first input signal corresponds to a first gesture performed on the surface, a first command corresponding to the first gesture, the first gesture not being detectable by a sensor embedded in, or in direct communication with, the surface.

2. The wearable electronic device of claim 1, wherein the wearable electronic device is a wrist-mounted device comprising a face, a case, and a band; and
    wherein the surface is on the case or on the band of the wrist-mounted device.

3. A wearable electronic device comprising:
    sensors configured to generate:
        in response to a first movement of the wearable electronic device, one or more first input signals; and
        in response to a second movement of the wearable electronic device, one or more second input signals;
    a surface;
    a microprocessor; and
    a memory having stored thereon instructions that, when executed by the microprocessor, control the microprocessor to execute:
        in response to an analysis of one or more first input signals indicating that one or more first input signals corresponds to a first gesture performed on the surface, a first command corresponding to the first gesture, the first gesture not being detectable by sensors embedded in, or in direct communication with, the surface; and
        in response to an analysis of one or more second input signals indicating that one or more second input signals correspond to a second gesture performed on the surface, a second command corresponding to the second gesture.

4. The wearable electronic device of claim 3, wherein the first command and the second command are distinct commands mapped to the first gesture and the second gesture, respectively.

5. The wearable electronic device of claim 3, wherein the first command executed by the microprocessor controls the wearable electronic device to respond to the first gesture by providing a feedback to the user.

6. The wearable electronic device of claim 3, wherein the sensors include an accelerometer and a gyroscope.

7. The wearable electronic device of claim 6, wherein one or more first input signals comprise an acceleration signal from the accelerometer and a rotational movement signal from the gyroscope.

8. The wearable electronic device of claim 3, wherein the first gesture is a member of a gesture family;
wherein the gestures in the gesture family are mapped to commands of a command family; and
wherein the first command is member of the command family.

9. The wearable electronic device of claim 8, wherein the gesture family comprises:
a left tap gesture performed by tapping a left side of the surface; and
a right tap gesture performed by tapping a right side of the surface.

10. The wearable electronic device of claim 8, wherein the gesture family comprises one or more of:
a swipe up;
a swipe down;
a swipe left; and
a swipe right.

11. The wearable electronic device of claim 3, wherein the wearable electronic device is a wrist-mounted device, and
wherein the surface is a band of the wrist-mounted device.

12. The wearable electronic device of claim 3, wherein the instructions, when executed by the microprocessor, further control the microprocessor to analyze one or more first input signals to determine if the first movement corresponds to the first gesture.

13. The wearable electronic device of claim 3, wherein the instructions, when executed by the microprocessor, further control the microprocessor to analyze one or more second input signals generated by the sensors to determine that one or more second input signals do not correspond to a gesture in a gesture family detectable by the wearable electronic device.

14. The wearable electronic device of claim 1 further comprising a transceiver;
wherein the instructions, when executed by the microprocessor, further control the microprocessor to transmit, using the transceiver, the first input signal to a paired device for analysis of the first input signal.

15. A method comprising:
capturing, in response to a movement of a wearable electronic device, first sensor data from a sensor integral to the wearable electronic device; and
providing, in response to an analysis of the first sensor data indicating that the movement corresponds to a first gesture performed on a surface of the wearable electronic device, a first command corresponding to the first gesture to a microprocessor of the wearable electronic device, the first gesture not being detectable by sensors embedded in, or in direct communication with, the surface.

16. The method of claim 15 further comprising analyzing the first sensor data.

17. The method of claim 16, wherein analyzing the first sensor data includes performing gesture event detection and performing gesture classification.

18. The method of claim 17, wherein gesture event detection includes comparing a peak value from the first sensor data to a threshold value.

19. The method of claim 17, wherein gesture classification includes extracting features from the first sensor data, generating an event vector based on at least a portion of the features, and comparing the event vector to gesture classification models.

20. The method of claim 19, wherein at least one of the gesture classification models is a user-independent model.

21. The method of claim 19, wherein at least one of the gesture classification models is based, at least in part, on contacts upon the surface, at least one of the contacts corresponding to a gesture in a gesture family.

22. The method of claim 17, wherein gesture event detection includes distinguishing a gesture event from a non-gesture event.

23. The method of claim 15 further comprising:
capturing second sensor data from the sensor integral to the wearable electronic device; and
analyzing the second sensor data to determine if the second sensor data does not correspond to a gesture in a gesture family detectable by the wearable electronic device.

24. A non-transitory computer readable medium having stored thereon computer program code that, when executed by a processor, controls a processor to perform a method according to claim 15.

* * * * *